United States Patent
Parker

[15] 3,707,191
[45] Dec. 26, 1972

[54] GEL FLUID WATER FLOODING METHOD

[72] Inventor: Harry W. Parker, Lubbock, Tex.

[73] Assignee: Phillips Petroleum Company

[22] Filed: May 27, 1970

[21] Appl. No.: 41,089

[52] U.S. Cl. ................................................. 166/275
[51] Int. Cl. ............................................. E21b 43/22
[58] Field of Search......166/275, 274, 268, 305, 273; 252/8.55 D

[56] References Cited

UNITED STATES PATENTS

| | | |
|---|---|---|
| 2,341,500 | 2/1944 | Detling ........................... 166/274 UX |
| 3,396,790 | 8/1968 | Eaton ................................... 166/270 |
| 3,525,396 | 8/1970 | Chew................................. 166/274 X |
| 2,731,414 | 1/1956 | Binder, Jr. et al..................... 166/274 |
| 3,308,883 | 3/1967 | Foster .................................... 166/275 |
| 3,018,826 | 1/1962 | Sandiford ......................... 166/275 X |
| 3,548,941 | 12/1970 | Graham.................................. 166/274 |
| 3,020,953 | 2/1962 | Zerweck et al........................ 166/274 |

*Primary Examiner*—Stephen J. Novosad
*Attorney*—Young and Quigg

[57] ABSTRACT

A method of raising and lowering the injection rate of a gel flood water for controlling the flood front.

7 Claims, No Drawings

GEL FLUID WATER FLOODING METHOD

This invention resides in an improved method for water flooding a hydrocarbon containing formation with a gel flood water. In another aspect, this invention relates to a method for controlling the advance of the flood front through the formation.

An age-old problem in flooding subterranean formations for the recovery of the hydrocarbons is the development and maintenance of a uniform flood front. Unless a uniform flood front is developed and maintained, sometimes large quantities of hydrocarbons will be bypassed to remain unrecovered in the formation.

It is therefore an object of this invention to provide an improved method of water flooding a hydrocarbon containing formation. Another object of this invention is to provide a method for injecting a gel and flood water mixture for controlling the advance of the flood front to the formation. Other aspects, objects, and advantages of the present invention will become apparent from the study of the disclosure and appended claims.

In the operation of this water flooding method, a subterranean hydrocarbon containing formation is penetrated by at least one injection well and at least one remotely located producing well. It should be understood, however, that this invention can be practiced where a plurality of producing and injection wells are utilized to flood and produce a common hydrocarbon containing formation. The relative placements of the producing wells are remote from any injection well and can be in various patterns such as five spot, seven spot, etc., as known in the art.

A stream of flood water and gel forming material mixture is injected at a first rate downwardly through the injection well or wells and into the formation for a preselected period of time. After that predetermined injection period, the rate of injection of the material mixture stream is decreased to a second rate that is at least 75 percent less than said first rate. This flow rate decrease from the first to the second rate is accomplished over a preselected period of time. Thereafter, the injection rate is increased to the first rate at least once. During these injection rate manipulations, hydrocarbons entering the producing well or wells are produced to the surface and captured.

Examples of the gel forming materials that can be utilized with this invention are as follows:

1. Partially hydrolyzed polyacrylamides gelled with polyvalent metal ions such as iron.
2. Partially hydrolyzed polyacrylamides gelled with formaldehyde.
3. Lignosulfonates gelled with dichromates.
4. Carboxymethyl cellulose gelled with polyvalent metal ions such as Al.
5. Materials which form gels by adsorption and interaction with the reservoir rock such as partially hydrolyzed polyacrylamides, and carboxy methyl cellulose.

The gel forming materials utilized can be materials which form gelatinous material in situ or which merely add gel particles to the flood water. Regardless of a particular mode of gel formation, it has been found that reduced mobility and completely fluid static conditions or zero mobility within the formation causes the gel to form or gels to become associated with the pore spaces in a manner such as to change the fluid flow characteristics to the formation. It has also been found that increased gas saturation of the in-place hydrocarbons dampens the hydraulic pressure waves formed through the formation by increasing or decreasing the flow rate of the injection fluid. For this reason, it is generally preferred that the second flow rate be zero and that a cyclic treatment is actuated whereby fluid is injected at a first rate, reduced to a second rate, and thereafter the injection rate is increased to the value of the first rate, and this cycle repeated no more than twice a week. It is also preferred that the second rate be maintained for a period of time of at least one day. Cyclic and slowdown periods greater than the above do not allow sufficient immobility of the gel particles to assure the in-place change of the flow characteristics.

In order to prevent the formation of areas of greatly increased permeability of the formation with resultant decreased floor front uniformity, the first injection rate should be controlled to a pressure lower than the fracturing pressure of the formation. In order to lower the expenditure of labor, and increase the effectiveness of the flooding operation without disrupting the partially plugged pore portions of the formation, it is preferred that the period of time required to decrease the flow rate from the first to the second rate be as short as possible with the control equipment utilized and the increase of injection rate from the second to the first rate be sufficient so as to prevent hydraulic shock waves from reaching a magnitude sufficient to shear formation pore positioned gel particles.

Although the selected volumes and rates of injection are dependent upon the properties of the hydrocarbon containing formation and the in-place hydrocarbons, it is generally recommended that where the gel forming material is a polymer, the concentration of said material be in the range of about 0.01 percent to 0.5 percent by volume. At greater concentrations, portions of the formation are excessively plugged and at lesser concentrations there is inadequate plugging. In either case, the inefficiency of the flooding is increased and hydrocarbons are bypassed in the formation. Data obtained from core and fluid sample analyses are helpful in correlating the operation to the particular reservoir. An example of water flooding operation using the method of this invention is as follows:

EXAMPLE

Waterflooding is accomplished with water containing 0.1 volume percent gel particles composed of 2,000 ppm partially hydrolyzed polyacrylamide and 400 ppm ferric chloride hexahydrate. The injection rate is decreased from 500 bbl/day to 100 bbl/day over a period of 6 days, held at 100 bbl/day for 1 day then the injection rate is returned to 500 bbl/day. This cycle is repeated during the life of the waterflood project.

Other modifications and alterations of this invention will become apparent to those skilled in the art from the foregoing discussion and it should be understood that this invention is not to be unduly limited thereto.

What is claimed is:

1. A method for recovering hydrocarbons from subterranean hydrocarbon containing formations penetrated by at least one injection well and at least one remotely located producing well, comprising the steps of:

A. injecting a stream of flood water and gel forming material mixture through the injection well and into the formation at a first rate for a preselected period of time;

B. decreasing over a preselected period of time the rate of injecting the material mixture stream to a second rate which is at least decreased by 75 percent relative to the first rate and which is maintained for a period of at least 1 day;

C. terminating the injection decreasing step of B by repeating at least Step A at least once; and D. producing hydrocarbons entering the producing well from the hydrocarbon containing formation.

2. A method, as set forth in claim 1, wherein steps A and B are repeated not greater than twice a week.

3. A method, as set forth in claim 1, wherein the second rate is zero.

4. A method, as set forth in claim 1, wherein the first rate is controlled to maintain an injection pressure lower than the fracturing pressure of the formation.

5. A method, as set forth in claim 1, wherein the gel forming materials are selected from at least one of a group consisting of partially hydrolyzed polyvalent iron ion gelled polyacrylamides, partially hydrolyzed, formaldehyde gelled polyacrylamides, dicromate gelled Lignosulfonate, and polyvalent metal ion gelled carboxymethyl cellulose.

6. A method, as set forth in claim 1, wherein the gel forming material is a polymer mixed with the flood water at a concentration in the range of about 0.01 percent to 0.5 percent by volume.

7. A method, as set forth in claim 1, wherein there are a plurality of injection wells through which the flood water and gel forming material is injected and a plurality of producing wells through which hydrocarbons are produced from the formation.

* * * * *